US008107877B2

(12) United States Patent
Thomas et al.

(10) Patent No.: US 8,107,877 B2
(45) Date of Patent: Jan. 31, 2012

(54) SYSTEM FOR PROCESSING RADIO FREQUENCY SIGNALS

(75) Inventors: Glyn Bolton Thomas, Portsmouth (GB); Gary Raymond Cobb, Portsmouth (GB); Graham Michael Weaver, Portsmouth (GB)

(73) Assignee: Astrium Limited, Hertfordshire (GB)

( * ) Notice: Subject to any disclaimer, the term of this patent is extended or adjusted under 35 U.S.C. 154(b) by 557 days.

(21) Appl. No.: 11/665,923

(22) PCT Filed: Oct. 21, 2005

(86) PCT No.: PCT/GB2005/050188
§ 371 (c)(1),
(2), (4) Date: Apr. 20, 2007

(87) PCT Pub. No.: WO2006/043115
PCT Pub. Date: Apr. 27, 2006

(65) Prior Publication Data
US 2008/0090516 A1    Apr. 17, 2008

(30) Foreign Application Priority Data
Oct. 21, 2004    (GB) .................................. 0423394.6

(51) Int. Cl.
*H04B 7/185*    (2006.01)
(52) U.S. Cl. .................................................... 455/12.1
(58) Field of Classification Search .................. None
See application file for complete search history.

(56) References Cited

U.S. PATENT DOCUMENTS

| 4,228,401 | A | * | 10/1980 | Wachs et al. | 455/13.3 |
| 4,262,361 | A | * | 4/1981 | Hauer | 455/113 |
| 4,429,418 | A | * | 1/1984 | Hooper | 455/314 |
| 5,055,800 | A | * | 10/1991 | Black et al. | 331/1 A |
| 5,300,838 | A | * | 4/1994 | Elizondo | 327/553 |
| 5,999,128 | A | * | 12/1999 | Stephens et al. | 342/375 |
| 6,031,878 | A | * | 2/2000 | Tomasz et al. | 375/316 |
| 6,229,986 | B1 | * | 5/2001 | Wu et al. | 455/12.1 |

(Continued)

FOREIGN PATENT DOCUMENTS
EP    0 472 018 A2    2/1992
(Continued)

OTHER PUBLICATIONS

Franke et al., "UHF SATCOMM Downlink Interference for the Mobile Platform", IEEE, vol. 1, pp. 22-28, Oct. 1996.*

(Continued)

*Primary Examiner* — Yuwen Pan
*Assistant Examiner* — Ayodeji Ayotunde
(74) *Attorney, Agent, or Firm* — Buchanan Ingersoll & Rooney PC

(57) ABSTRACT

Exemplary embodiments are directed to a reconfigurable system for the analogue processing of radio frequency signals in a satellite communications system. The system receives a pre-selected first intermediate frequency and selects one or more first frequency channels from the input signal, to amplify and provide automatic gain control of the selected first channel signals and to translate the selected first channels to one or more second frequency channel signals within a pre-selected second intermediate frequency band. The first and second intermediate frequencies are selected to minimize conversion of the uplink and downlink signals. The system provides a generic flexible communications satellite payload architecture based on single channel agile conversion and provides adjustable frequency conversion and bandwidth to individual satellite channels, allowing in-orbit flexible reconfiguration of payload frequency plan and operation.

36 Claims, 8 Drawing Sheets

U.S. PATENT DOCUMENTS

| | | | |
|---|---|---|---|
| 6,356,143 B2 * | 3/2002 | Waltman | 327/557 |
| 6,362,788 B1 * | 3/2002 | Louzir | 343/700 MS |
| 6,442,148 B1 * | 8/2002 | Adams et al. | 370/325 |
| 7,302,237 B2 * | 11/2007 | Jackson et al. | 455/76 |
| 2001/0007151 A1 * | 7/2001 | Vorenkamp et al. | 725/151 |
| 2001/0034206 A1 * | 10/2001 | Thompson et al. | 455/12.1 |

FOREIGN PATENT DOCUMENTS

| | | | |
|---|---|---|---|
| EP | 0 854 590 A2 | 7/1998 | |
| EP | 1 014 598 A2 | 6/2000 | |

OTHER PUBLICATIONS

International Search Report.

International Preliminary Report on Patentability PCT/IB373 dated Apr. 24, 2007 (including PCT/ISA/237) for PCT/GB2005/050188.

* cited by examiner

SYSTEM FOR PROCESSING RADIO FREQUENCY SIGNALS

FIELD

The present invention is directed toward the field of multi-beam communication satellites and in particular to improving the flexibility of communications satellite payloads.

BACKGROUND

Fixed point-to-point and broadcast services in C band (4-6 GHz) and Ku band (11-18 GHz) are expected to comprise the bulk of satellite communications traffic for the foreseeable future. Recently however, commercial satellite systems for use in the Ka-band spectrum (20-30 GHz) have been proposed. Conventionally, payload architectures have been tailored to specfific customer requirements, the satellite operator defining any specific flexibility that is required in terms of being able to select connectivity of specific channels from coverage areas. Once this flexibility has been specified, it is not possible to readily adjust this without affecting the design, schedule and cost of the satellite. This means specific equipment is, to some degree, limited to certain applications and it is not cost effective to optimise them for other applications. The operational lifetime of a communications satellite is typically around about 15 years, which presents a major constraint to operators if the performance of their satellite cannot be adjusted to meet evolving market demand over this period of time. Strong competition from terrestrial service providers means that satellite operators are now demanding more flexible solutions that would enable a satellite's resources to be matched throughout its lifetime to an evolving market requirement.

Most commercial communications satellites operate within the geo-stationary orbit and great care must be taken in designing the satellite's frequency plan and allocating orbital positions to ensure minimal interference between different users. Satellite transponders typically receive signals within one frequency band, process these signals and the retransmit them back to earth within another frequency band. Only certain bands of radio frequency (RF) can be used, with different sub-bands being allocated for signals to and from the satellite. These sub-bands are further divided into channels, with each channel being separated in frequency and having a typical bandwidth of a few 10 s of MHz.

The basic function of a satellite communications transponder is shown in FIG. 1. A weak received signal is passed from antenna 1 to low noise amplifier 2. The channel of interest is selected by filter 3 and then shifted to the appropriate downlink band by down-converter 4. Amplifier 5 provides sufficient gain for it to be transmitted to the Earth via antenna 6. This single conversion process is the most economic in terms of hardware required and is suitable for applications where there are only a few routing combinations between uplink and downlink frequencies.

Many operators now require a single satellite to handle uplink traffic in many bands and direct it to many different downlink bands. In this case, it is common for the transponders to employ double frequency conversion with the channel filtering and routing being performed at an intermediate frequency (IF). The selection and translation of the various frequencies is specified in a frequency plan and FIG. 2 shows a typical example. Some plans can be simple, but as operators replace ageing satellites and consolidate their services on single high performance satellites, frequency plans are becoming more complex. As these plans become more complex, it becomes increasingly difficult to select an appropriate IF such that the local oscillator harmonics and spurious mixing products from each set of conversions do not translate as interference in wanted bands.

Satellite power and mass are at a premium and conventional payload architectures aim to minimise the amount of equipment required to meet the particular frequency plan. A typical payload architecture is shown in FIG. 3, with the filtering and routing functionality embodied in a fixed switching network. Increasing the switch network complexity can confer a limited degree of flexibility in terms of which uplink signals are routed to a particular downlink but this rapidly becomes uneconomic in most applications.

Recent developments in digital signal processing technology have made it feasible to perform all the channel filtering and signal routing within a digital processor. However in space applications, limitations on power consumption and analogue to digital conversion speed has meant that only signals with input bandwidth of up to 100 MHz can be processed. This has proven adequate for high performance mobile communications via satellite and high security military systems.

However in order to manipulate the higher bandwidth signals currently contemplated, several digital processing chains may need to be connected in parallel, with pre-processing of the input signal being performed by analogue means so that each digital processing chain only receives up to 100 MHz.

A functional block diagram representing a digitally processed satellite payload is shown in FIG. 4. In a pre-processing stage, portions of the uplink RF spectrum are frequency converted and conditioned to baseband frequencies that are digitized these for the digital signal processing stage. In the post-processing stage, the processed digital signals are converted into analogue signals, frequency converted and routed to the appropriate downlink antenna path. These pre and post processing stages have very demanding requirements in terms of channel filtering and phase tracking, which are primarily driven by the need to achieve digital beam forming and unambiguous frequency domain processing.

Digital signal processors can perform very precise signal manipulations such as demodulation or very narrow-band filtering (e.g. selecting individual 5 kHz voice channels within a broad band). As is illustrated in FIG. 5, the signals of interest are filtered from the main uplink bands, down-converted in frequency and presented to processor at base-band (DC to about 140 MHz). For example, a single telephone call may arrive at the processor from a C-band uplink originating in one country and be directed to a downlink band that serves a different country. Many different phone calls, originating in different countries, would be grouped in frequency for onward transmission to the common destination country. The processor then sorts the channels within this input band and presents them at the output in the appropriate frequency block, ready for up-conversion to the chosen downlink frequency.

If the signals of interest are relatively wideband, such as TV transmissions, then digital processing may not be economic. In such cases the necessary selection and routing of signals is commonly performed by filters and switches that can operate efficiently at a relatively low intermediate frequency (IF processing).

One method of achieving the desired level of flexibility is described in U.S. Pat. No. 4,228,401, where reconfigurable beam interconnections are facilitated through the use of bandpass filters, each having variable bandwidth and variable center-frequencies. The filters are arranged in groups, each filter within the group passing a selected portion of the frequency band of the received signal. Within each filter, two successive frequency translations of the signal are performed and since the bandwidth and center-frequency of the filter function can be varied, the requirements of that particular channel at that particular time. A similar variable bandwidth filtering and frequency conversion system is described in shown in U.S. Pat. No. 4,262,361

Although, such filters are inherently suited for use in the pre- and post-processing stages of digitally processed satellite payload described above, the complexity of implementation has precluded their use in very high frequency applications such as communications satellites. Instead, Surface Acoustic Wave (SAW) filters have been used, and while these offer excellent channel filtering, they are a major cost driver due to their inherently high phase delay and as such they dominate the overall phase tracking performance.

SUMMARY

It is an object of the present invention to provide an improved communications satellite payload architecture.

It is a further object of the present invention to provide a flexible communications satellite payload architecture capable of efficient handling a broad spectrum of uplink traffic, while minimizing risk, power requirements and other factors associated with space based applications.

It is a further object of the present invention to provide a communications satellite payload architecture that exhibits frequency agility.

From a first aspect, the present invention resides in a reconfigurable system for the analogue processing of radio frequency signals in a satellite communications system, comprising means for receiving a signal within a pre-selected first intermediate frequency (IF1); agile filter means comprising a variable mixer stage and at least one variable filter, adapted to select one or more first frequency channels from the input signal, to amplify and provide automatic gain control of the selected first channel signals and to translate the selected first channels to one or more second frequency channel signals within a pre-selected second intermediate frequency band (IF2), wherein the agile filter means is controllable to allow in-orbit reconfiguration of the system.

The system provides a generic flexible communications satellite payload architecture based on single channel agile conversion is provided that provides adjustable frequency conversion and bandwidth to individual satellite channels, allowing in-orbit flexible reconfiguration of payload frequency plan and operation.

The agile filter means is preferably controlled to select appropriate first and second channels in dependence on the system requirements at a particular time. In this way, a high degree of payload flexibility can be conferred.

The mixer stage and the variable filter may be independently variable which allows adjustable frequency conversion and bandwidth to individual satellite channels.

The second frequency channel may occupy an equivalent position within the second intermediate frequency band as the selected first channel within the first intermediate frequency band or may occupy a different position.

The system preferably comprises a plurality of variable band-pass filters, each adapted to select a different channel within the first intermediate signal band (IF1). The variable band-pass filter(s) preferably have variable bandwidth and variable centre frequency.

In a preferred embodiment, the variable filter(s) employs fractional N synthesis. In a further embodiment, the variable band-pass filter(s) employs direct digital synthesis. These techniques advantageously allow the agile filter means to be continuously variable.

In one preferred embodiment, the first intermediate frequency (IF1) is in the range 5.75 to 6.8 GHz and the second intermediate frequency (IF2) is in the range 3.4 to 4.2 GHz. The intermediate frequencies are chosen to be the same as the standard C-band uplink and downlink and hence the need for conversion of a C band input signal and final up conversion to the C-band downlink is obviated.

In another embodiment, the first intermediate frequency (IF1) is in the range 7.9 to 8.4 GHz and the second intermediate frequency (IF2) is in the range 7.25 to 7.75 GHz. These frequency ranges are selected to correspond with the standard X-band uplink and downlink frequency ranges respectively so as to obviate the need for conversion of a X band input signal and final up conversion to the X-band downlink.

In yet another embodiment, the first intermediate frequency (IF1) is in the range 14 to 14.5 GHz and the second intermediate frequency (IF2) is in the range 11.7 to 12.2 GHz. These frequency ranges are selected to correspond with the standard Ku-band uplink and downlink respectively so as to obviate the need for conversion of a Ku band input signal and final up conversion to the Ku band downlink.

In a further embodiment, the first intermediate frequency (IF1) is in the range 0.304 to 0.318 GHz and the second intermediate frequency (IF2) is in the range 0.2431 to 0.2569 GHz. These frequency ranges are selected to correspond with the standard UHF-band uplink and downlink respectively so as to obviate the need for conversion of a UHF-band input signal and final up conversion to the UHF-band downlink.

Alternatively, the first and second intermediate frequencies may be selected from the same range. In one embodiment, the first and second intermediate frequency bands (IF1) and (IF2) are in the range 3.4 to 4.2 GHz. In alternative embodiments, the first and second intermediate frequency bands (IF1) and (IF2) are selected in the X-band downlink range 7.25 to 7.75 GHz, in the Ku band downlink range 11.7 to 12.2 GHz, and in the UHF-band downlink range 0.2431 to 0.2569 GHz respectively.

From another aspect, the invention resides in a satellite payload comprising the reconfigurable system described above.

From a further aspect, the present invention resides in a satellite communications processor for processing signals transmitted to the satellite in a plurality of uplink bands, comprising means for down converting the received signals to a first common intermediate frequency (IF1);

means for routing the signals;

agile filter means controlled to selected predetermined channels of the routed signals and to translate the selected channel to a second intermediate frequency (IF2); and means for up-converting the frequency translated signal to the appropriate downlink band.

The first intermediate frequency preferably lies in the C-band and most preferably lies within the range of 5.87 GHz to 6.8 GHz The invention also resides in a method of processing signals transmitted to the satellite in a plurality of uplink bands, comprising converting the received signals to a lower first common intermediate frequency (IF1);

routing the converted signals;

controlling filter means to select predetermined channels of the routed signals;

translating the frequency of the selected channel signals to a second intermediate frequency (IF2); and up-converting the frequency translated signals to the appropriate downlink band.

DESCRIPTION OF THE DRAWINGS

The background to the present invention and an embodiment thereof is described with reference to the following figures in which:

FIG. 8 is an example of a frequency plan which may be implemented with a; and

DETAILED DESCRIPTION

Figure 6:
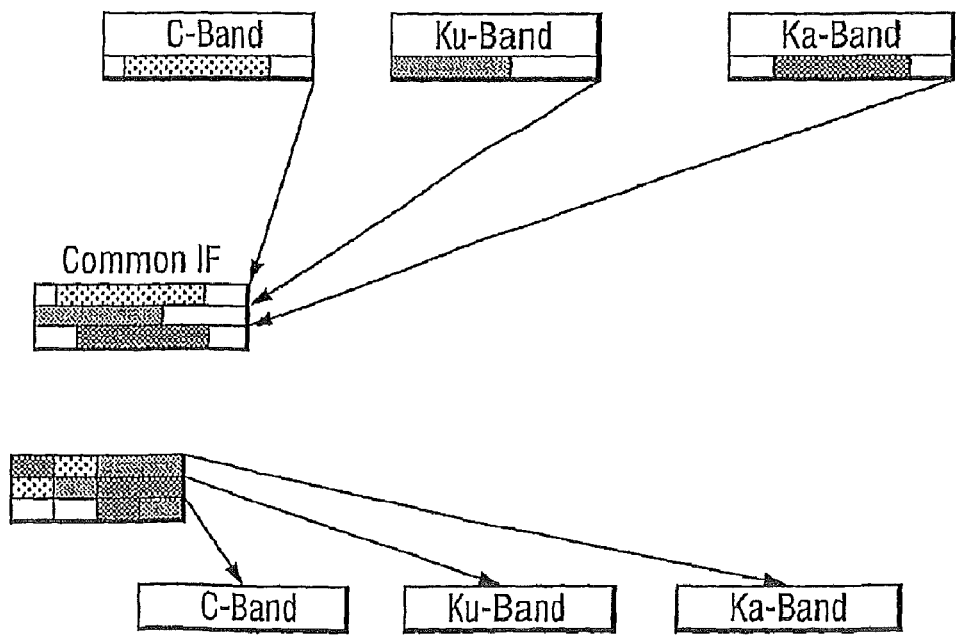
FIG. 6 is a simplified representation of the processing involved in a communications satellite payload according to a preferred embodiment of the present invention.
Figure 7:
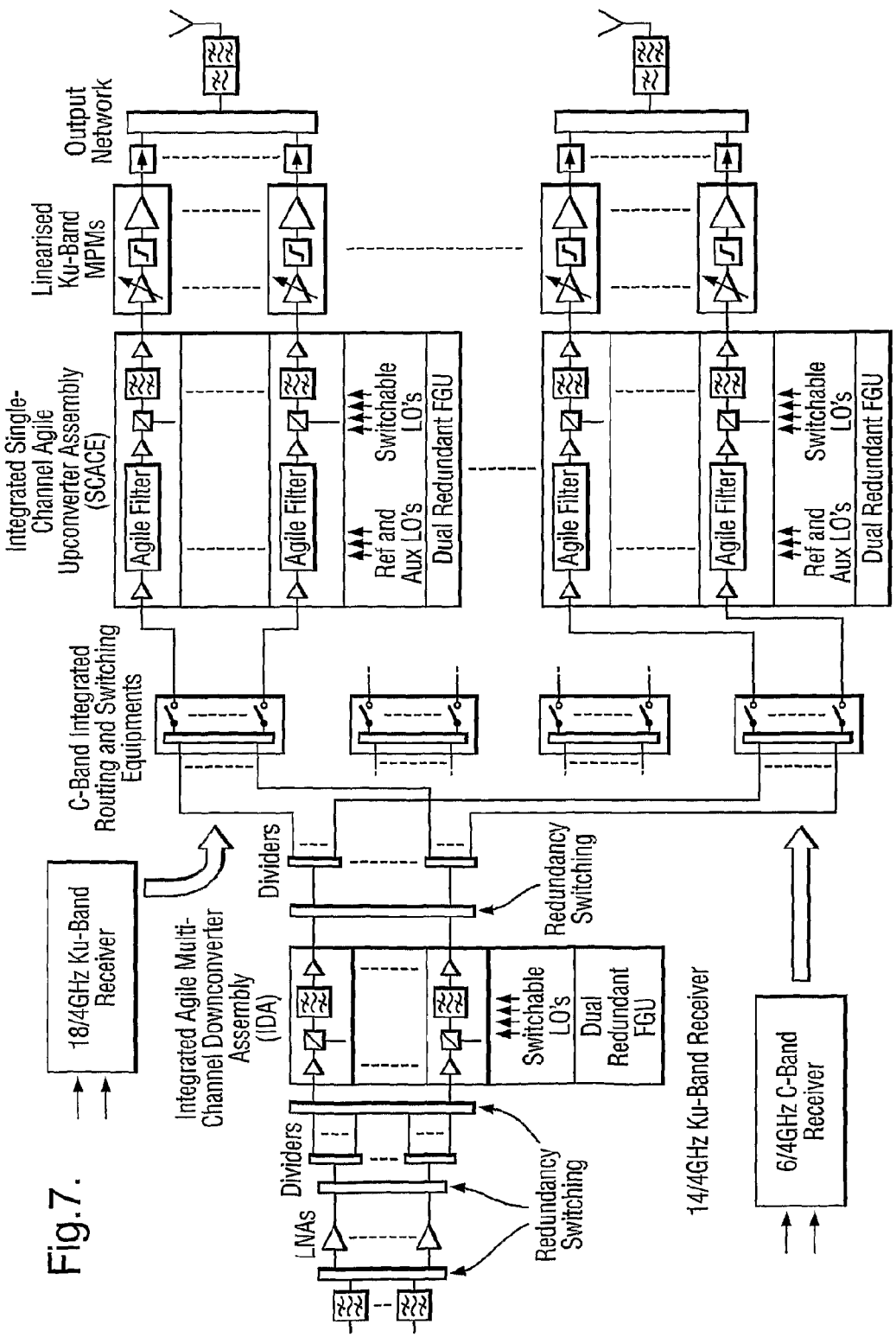
FIG. 7 is a schematic representation of a communications satellite payload architecture according to a preferred embodiment of the present invention.

A preferred embodiment of the present invention will now be described with reference to FIGS. 6, 7 and 8. FIG. 6 is a simplified representation of the processing steps used in the present invention while FIG. 7 illustrates one architectural embodiment upon which this invention is based. At a particular time, satellite receives signals from its input spectrum (C-band, X-band, UHF-band, Ku-band and Ka band) each signal containing n channels. The n channels are ultimately routed, processed and then transmitted to the appropriate destination. To efficiently perform the routing function, the received signals are down converted in an appropriate RF mixer stage, to a first common C-band intermediate frequency ($IF_1$) which has been specifically chosen to be the same as the standard C-band uplink.

The choice of intermediate frequency is particularly difficult in multi-band systems because of the need to ensure that spurious harmonic products do not cause unwanted interference. In block converters, two categories of undesired spurious signals arise; signal related and non-signal related. Signal related spurious signals vary in level and are caused by intermodulation products created in the frequency conversion circuits and spurious outputs present on local oscillator signals. Non-signal related spurious signals are of constant amplitude and are created by leakage of the internal oscillator signals. It has been found that conversion to a common intermediate frequency ($IF_1$) of between 5.75 and 6.8 GHz produces optimum results.

The down converted signals are then divided and distributed via an integrated routing and switching block to the power amplifiers. Prior to input to the power amplifier, the signals are applied to an agile filter block which is controlled to select an appropriate channel, filter and shift the signal to a second intermediate frequency ($IF_2$) also within the C band, ready for block conversion to the appropriate downlink band. A second intermediate frequency of between 3.4 to 4.2 GHz is preferably achieved.

Figure 1:
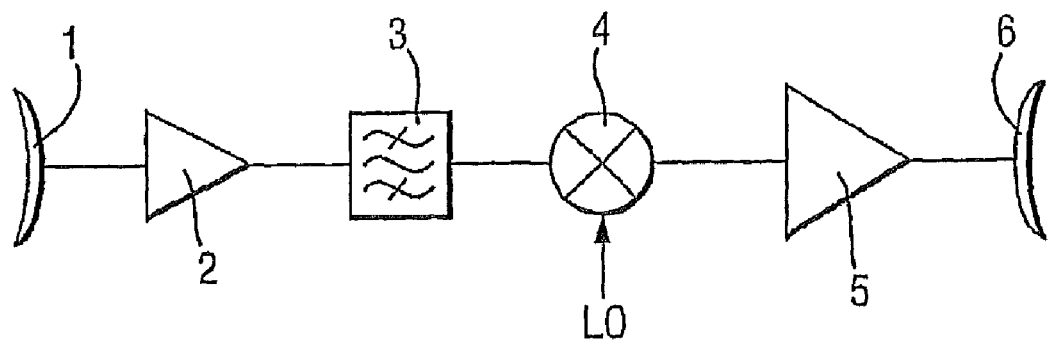
FIG. 1 is a block diagram of a conventional communications satellite transponder.
Figure 9:
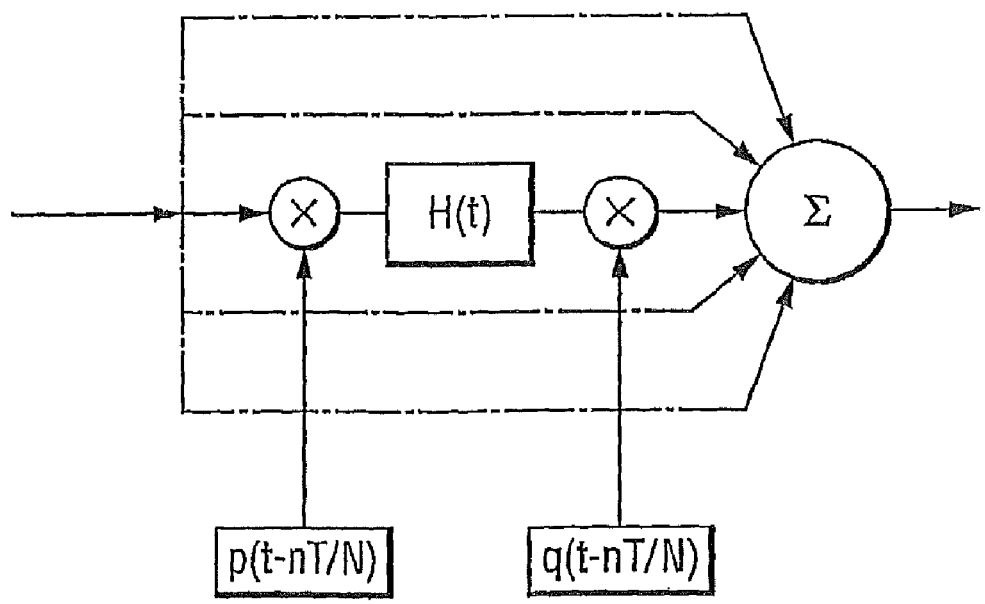
FIG. 9 is a schematic representation of an N-path filter used in a communications satellite payload architecture according to a preferred embodiment of the present invention
Figure 2:
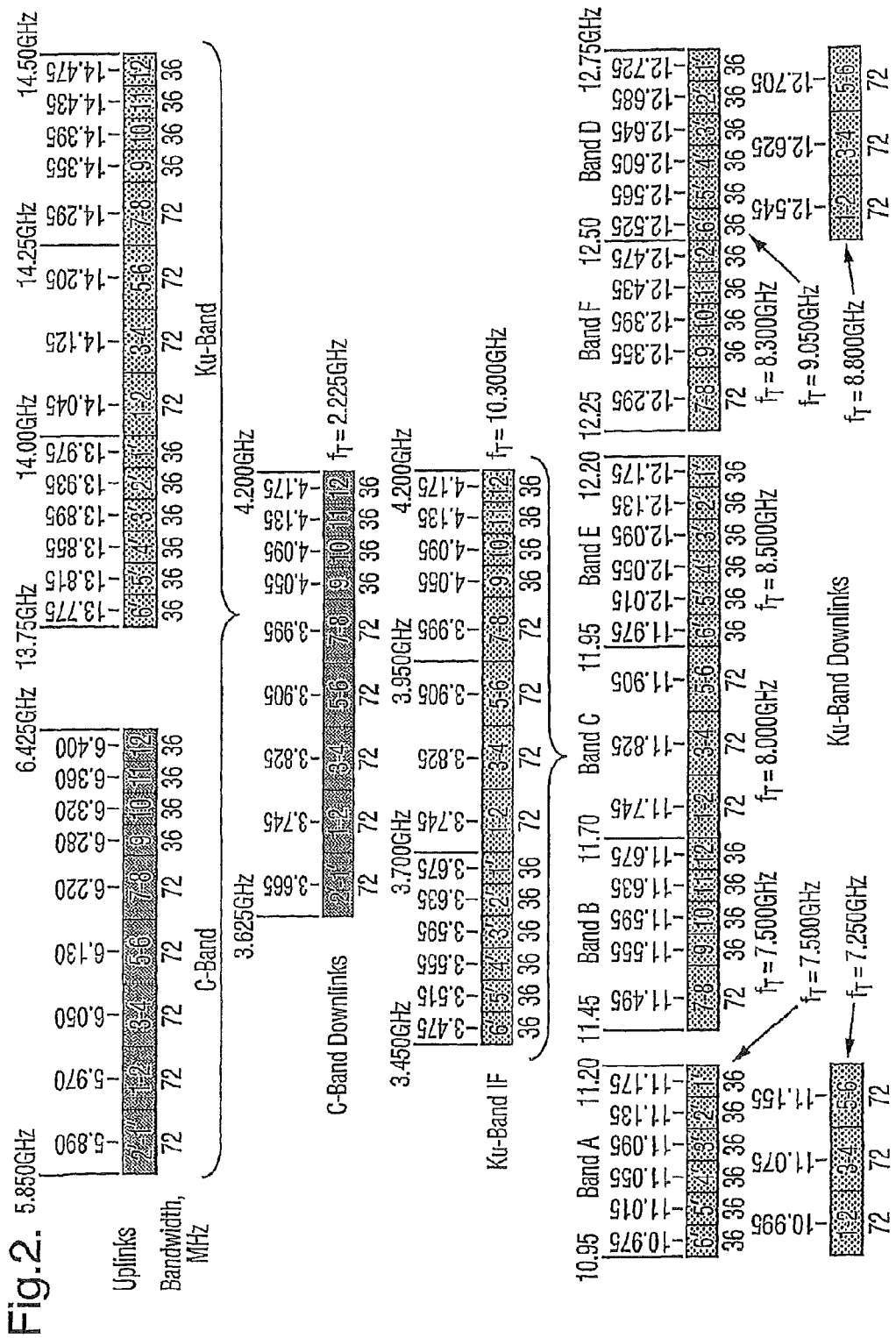
FIG. 2 is an example of a frequency plan of a typical conventional communications satellite transponder.
Figure 3:
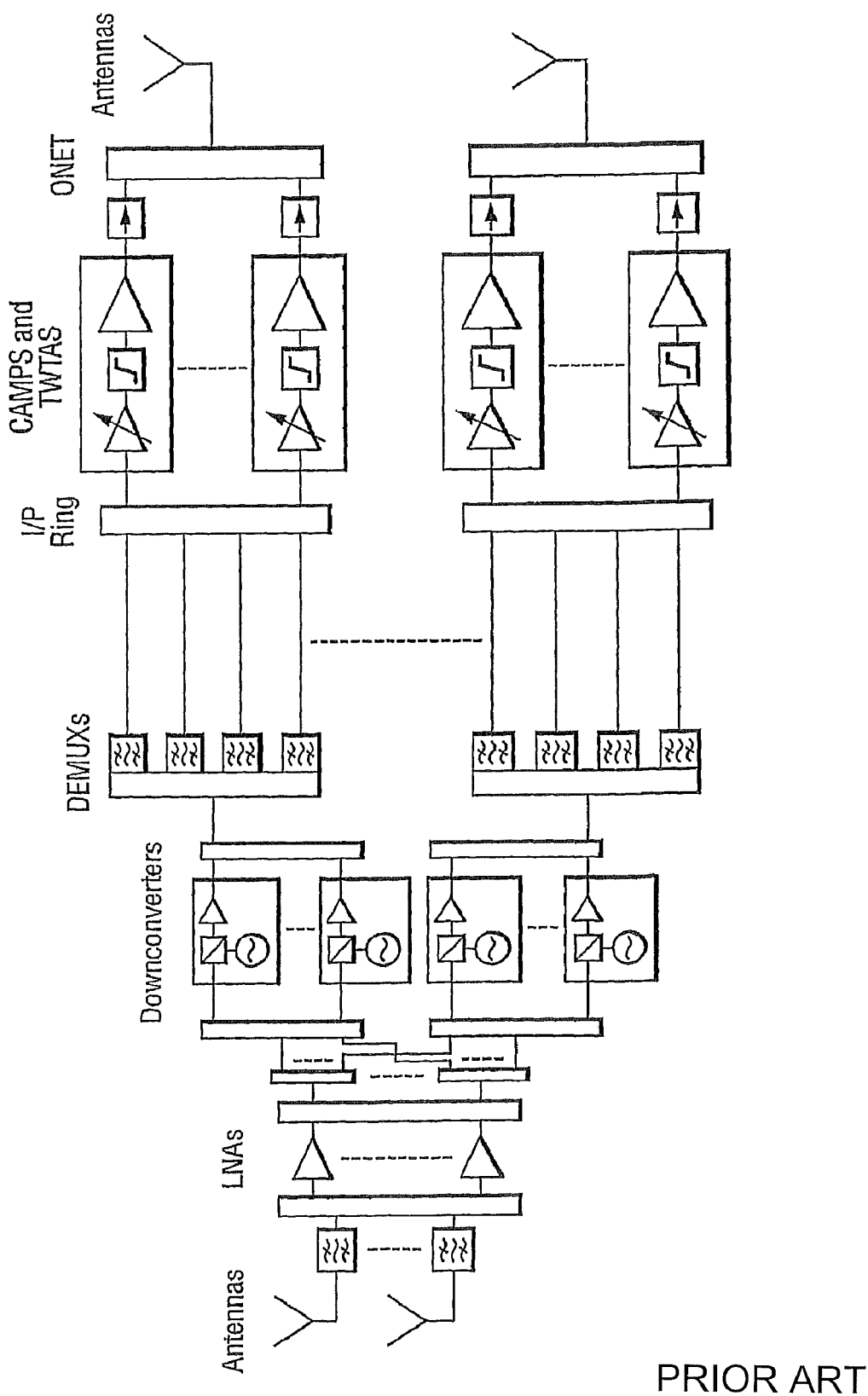
FIG. 3 is a schematic representation of a conventional communications satellite payload architecture.
Figure 4:
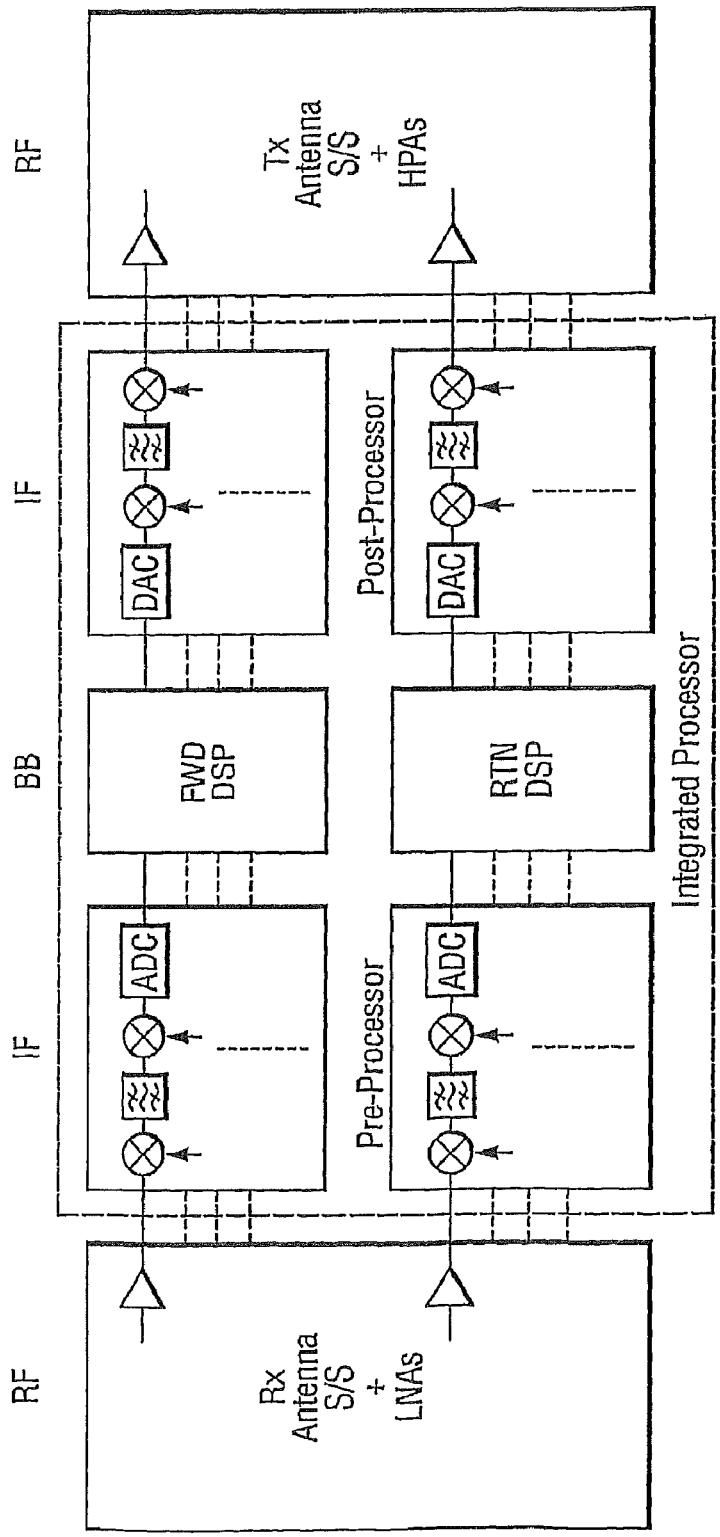
FIG. 4 is a block diagram of a conventional digitally-processed communications satellite payload.
Figure 5:
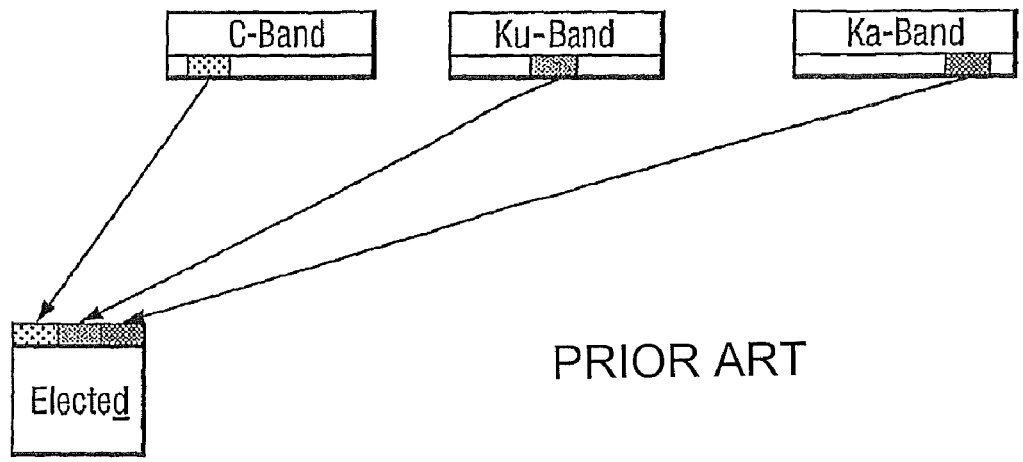
FIG. 5 is a simplified representation of the processing steps involved in a conventional digitally-processed communications satellite payload.

The agile filter block used is similar to that described in U.S. Pat. No. 4,262,361 and essentially comprises a combination of two fixed filters with frequency converters. A functional representation of such a N-path filter is shown in FIG. 9. By frequency shifting the two filter edges by different amounts, the band-pass and band center characteristic of the combined filters can be varied, dependent only on the setting of the frequency converters. Fractional N-synthesis permits the frequency converters to be continuously variable. As a result, the input channels are effectively collected and distributed to all the power amplifiers, the agile filter function coupled to or ideally within each amplifier being controlled to selecting the appropriate channel depending on the requirements at that particular time. In this way a high degree of payload flexibility can be conferred.

It should however be appreciated that other appropriate filtering techniques, such as, for example, direct digital synthesis could also be used.

Advantageously, in the above embodiment, the choice of these particular intermediate frequencies $IF_1$ and $IF_2$, specifically chosen to be the same as the standard C-band uplink and downlink, obviates the need for conversion of a C band input signal and final up conversion to the C-band downlink.

Although the described embodiment uses first and second intermediate frequency bands within the C band, it should be appreciated that intermediate frequencies within other bands may be selected. For example, the first intermediate frequency (IF1) may be selected to correspond with the standard X-band uplink, i.e., in the range of 7.9 to 8.4 GHz) and the second intermediate frequency (IF2) may be selected to correspond with the X-band downlink, i.e., in the range 7.25 to 8.4 GHz. Alternatively, the first intermediate frequency (IF1) may be selected to correspond with the standard Ku-band uplink, i.e., in the range 14 to 14.5 GHz and the second intermediate frequency (IF2) may be selected to correspond with the standard Ku-band downlink, i.e., in the range 11.7 to 12.2 GHz. In each instance, the intermediate frequencies are selected so as to ensure that the local oscillator harmonics and spurious mixing products from each set of conversions do not translate as interference in wanted bands.

In other circumstances, it may be appropriate that both the first and second intermediate frequencies are selected from the same range which may correspond with a particular standard uplink or downlink. For example, the first and second intermediate frequencies could be selected to correspond with the X band downlink, i.e., in the range 7.25 to 7.75 GHz, or with the Ku-band downlink, i.e., in the range 11.7 to 12.2 GHz.

Because there is a greater spectral allocation within Ku and Ka band than C band, agile converters are used to "block convert" 1 GHz blocks of Ku and Ka band into the C band intermediate frequencies. The equipment is spectrally located between the standard C band uplink and downlink frequencies and is effectively an analogue processor operating over 1 GHz of spectrum.

Figure 8:
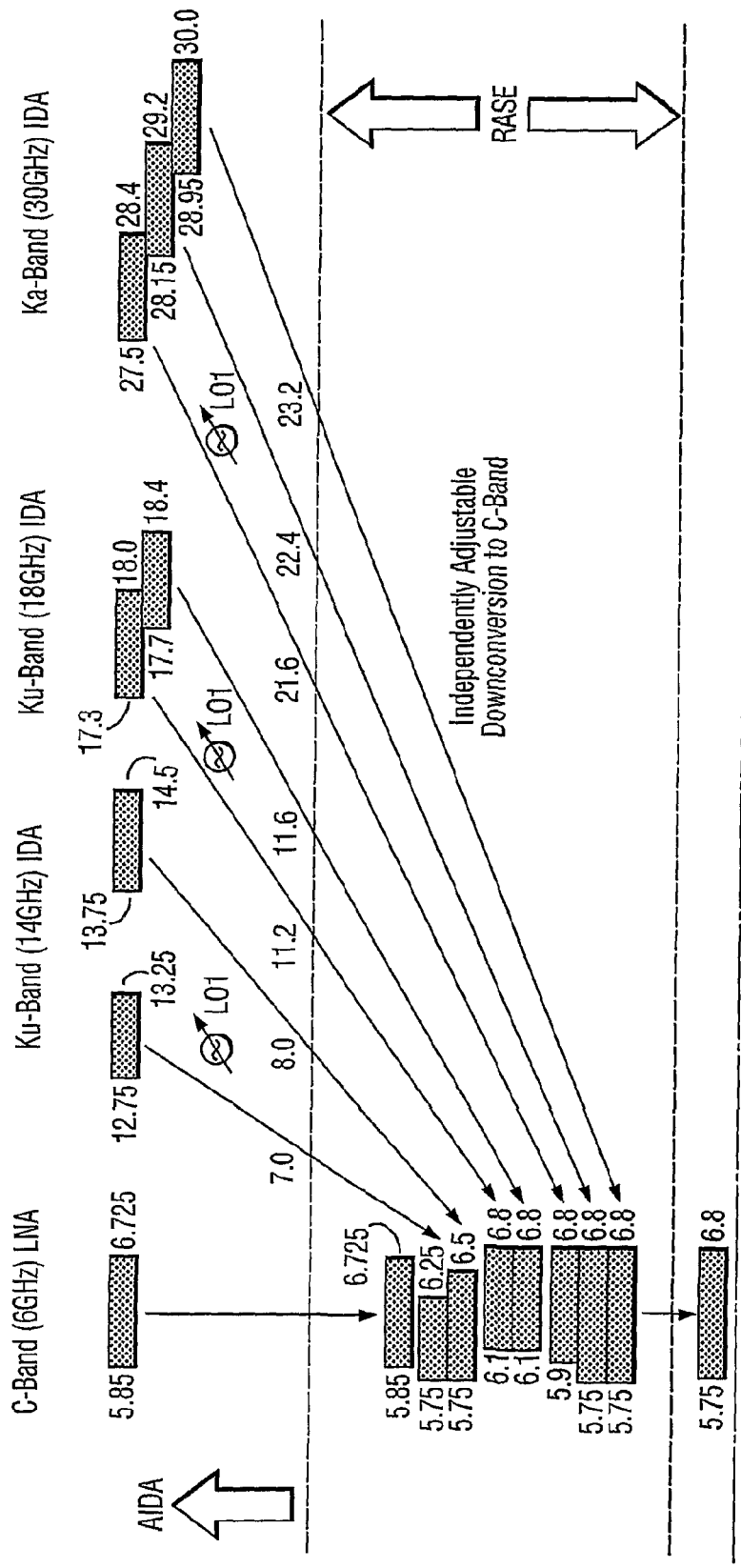
Figure 8:
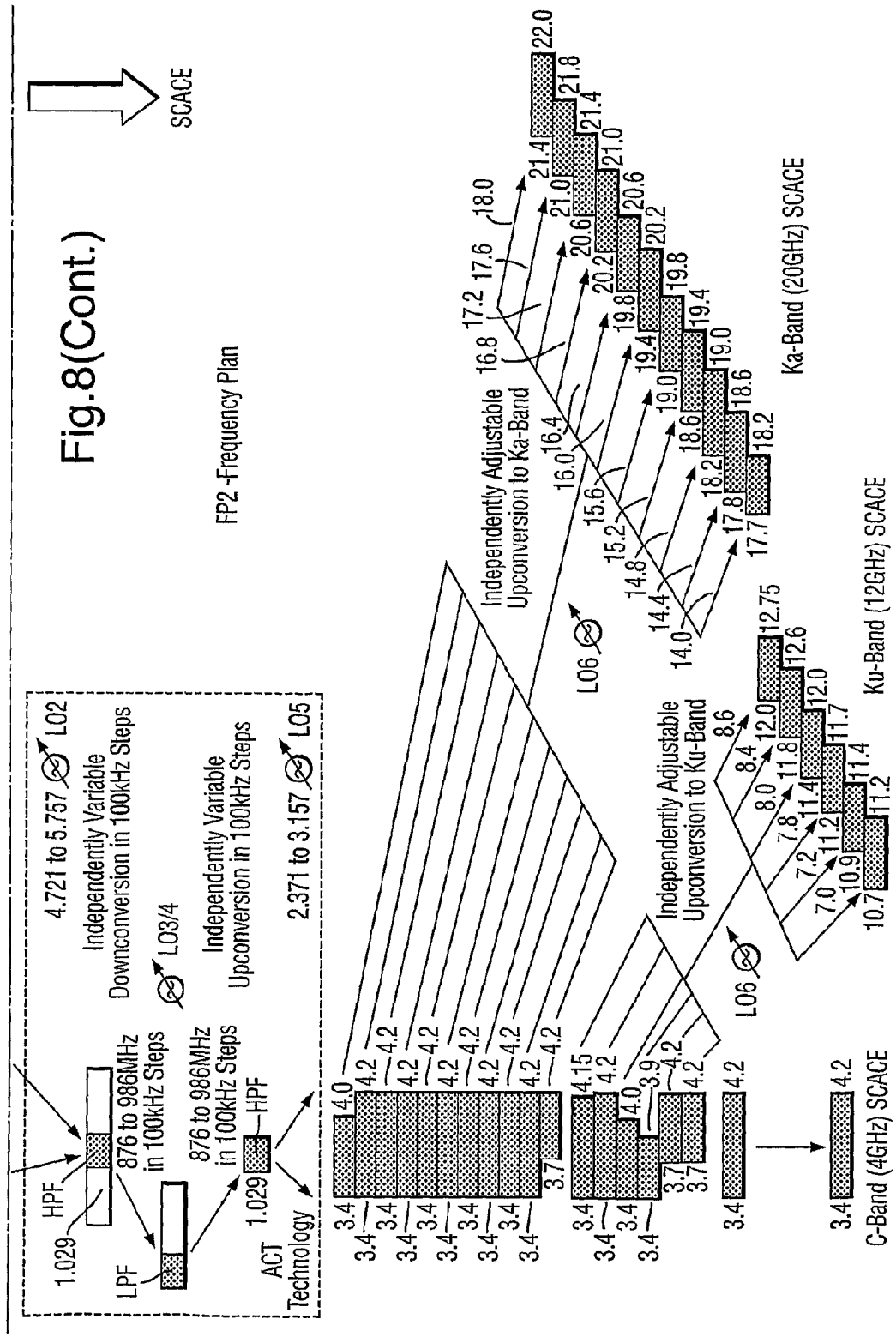

As is illustrated in the frequency plan of FIG. 8, four primary frequency conversions are carried out which have been chosen to avoid potential problems caused by in-band spurious harmonic products. By appropriate control of the converters and filters, it is possible to select any channel within the intermediate frequency uplink spectrum, change its bandwidth, and convert it to any channel located within the IF downlink spectrum. The frequency plan has been shown for examples of 120, 72 and 36 MHz channel filters but the concept is generic and able to achieve any channel bandwidth in the range 20 to 120 MHz. By adopting the frequency plan shown in FIG. 8, it is possible to implement a payload input stage using techniques such as N-path channel filtering approach to provide flexible and re-configurable frequency planning for almost all commercial communication satellites.

For applications such as Fixed Satellite Services (FSS) and Broadcast Satellite Services (BSS) the very high degree of flexibility conferred by the DSP is not required. In these applications the frequency flexibility offered by the pre- and post-processing functions alone would be sufficient.

Use of the agile filter block presents additional advantages with regard to linearisation of wideband microwave power amplifiers. At present, the amplifiers have to be linearised over the whole band in which they might operate, while in practice, the amplifier may only process signals that reside within a portion of the nominal band. By including the agile filter block in a linearisation feedback path, it is possible to only linearise the amplifier over the portion of the band in which it is actually operating. This increases the efficiency of the amplifier, which is a good thing for spacecraft where power is at a premium.

The payload configuration of FIG. 7 is flexible and generic. The block diagram shows a Ku to Ku-band (14/12 GHz) payload but indicates also how C-band or Ku-band (18 GHz) payload uplinks may be conveniently connected in. The output sections show only Ku-band agile converter within a Ku-band output section. A C-band agile converter within a C-band output section can be similarly connected.

The architecture of the present invention effectively offers a distributed intermediate frequency processing solution thereby eliminating many of the undesirable consequences of a single "large box" approach. The distributed approach used permits payload layout flexibility to derive the optimum mechanical solution and the main processing unit to take DC power from the HPA for each channel thereby simplifying the DC power distribution sub-system. Moreover, since the signals are transported around the payload are at relatively benign (C band) frequencies, the inevitable mismatches and losses are tolerable and signal gain is simple to achieve. The architecture is advantageous in that it can be readily sized and scaled to meet any customer requirement while qualification, procurement and testing of the various equipment is much simplified when compared with the large single processor In summary, a generic flexible communications satellite payload architecture based on single channel agile conversion is provided that provides adjustable frequency conversion and bandwidth to individual satellite channels, allowing in-orbit flexible reconfiguration of payload frequency plan and operation.

The invention claimed is:

1. A reconfigurable system for the analogue processing of radio frequency signals received in a plurality of uplink bands and of radio frequency signals for transmission in a plurality of downlink bands in a satellite communications system, comprising:
a downconverter arrangement for downconverting received radio frequency signals in the plurality of uplink bands to a pre-selected first common intermediate frequency (IF1) band;
means for dividing and routing the downconverted signals;
agile filter means comprising at least one variable filter, and adapted for selecting one or more first frequency channel signals from the routed signals, to amplify and provide automatic gain control of the selected first frequency channel signals and for translating the selected one or more first frequency channel signals to one or more second frequency channel signals within a pre-selected second common intermediate frequency band (IF2); and
an up-converter arrangement for up-converting the frequency translated signals to one or more appropriate downlink bands,
wherein the agile filter means is controllable to allow in-orbit reconfiguration of the system and the agile filter means is controllable to select appropriate first and second frequency channels in dependence on system requirements at a particular time.

2. The reconfigurable system according to claim 1, wherein the at least one variable filter comprises variable frequency converters and two fixed filters.

3. The reconfigurable system according to claim 1, wherein the at least one variable filter exhibits a variable bandwidth and a variable center frequency.

4. The reconfigurable system according to claim 1, wherein the at least one variable filter employs fractional N synthesis.

5. The reconfigurable system according to claim 1, wherein the at least one variable filter employs direct digital synthesis.

6. The reconfigurable system according to claim 1, wherein the second frequency channel signals occupy equivalent positions within the second common intermediate frequency band as the first frequency channel signals within the first common intermediate frequency band.

7. The reconfigurable system according to claim 1, wherein the first and second common intermediate frequency bands are selected so as to minimize conversion of the uplink and downlink bands.

8. The reconfigurable system according to claim 1, wherein the first common intermediate frequency band (IF1) is in the range 5.75 to 6.8 GHz and the second common intermediate frequency band (IF2) is in the range 3.4 to 4.2 GHz.

9. The reconfigurable system according to claim 1, wherein both the first and second common intermediate frequency bands (IF1) and (IF2) are in the range 3.4 to 4.2 GHz.

10. The reconfigurable system according to claim 1, wherein the first common intermediate frequency band (IF1) is in the range 7.9 to 8.4 GHz and the second common intermediate frequency band (IF2) is in the range 7.25 to 7.75 GHz.

11. The reconfigurable system according to claim 1, wherein the first common intermediate frequency band (IF1) is in the range 0.304 to 0.318 GHz and the second common intermediate frequency band (IF2) is in the range 0.2431 to 0.2569 GHz.

12. The reconfigurable system according to claim 1, wherein both the first and second common intermediate frequency bands (IF1) and (IF2) are in the range 7.25 to 7.75 GHz.

13. The reconfigurable system according to claim 1, wherein the first common intermediate frequency band (IF1) is in the range 14 to 14.5 GHz and the second common intermediate frequency band (IF2) is in the range 11.7 to 12.2 GHz.

14. The reconfigurable system according to claim 1, wherein both the first and second common intermediate frequency bands (IF1) and (IF2) are in the range 11.7 to 12.2 GHz.

15. The reconfigurable system according to claim 1, wherein both the first and second common intermediate frequency bands (IF1) and (IF2) are in the range 0.2431 to 0.2569 GHz.

16. A satellite payload comprising a reconfigurable system according to claim 1.

17. The reconfigurable system according to claim 2, wherein the at least one variable filter exhibits a variable bandwidth and variable center frequency.

18. The reconfigurable system according to claim 3, wherein the at least one variable filter employs fractional N synthesis.

19. The reconfigurable system according to claim 3, wherein the at least one variable filter employs direct digital synthesis.

20. The reconfigurable system according to claim 5, wherein the second frequency channel signals occupy equivalent positions within the second intermediate frequency band as the first frequency channel signals within the first intermediate frequency band.

21. The reconfigurable system according to claim 6, wherein the first and second intermediate frequency bands are selected so as to minimize conversion of the uplink and downlink signals.

22. The reconfigurable system according to claim 7, wherein the first common intermediate frequency band is in the range 5.75 to 6.8 GHz and the second common intermediate frequency band is in the range 3.4 to 4.2 GHz.

23. The reconfigurable system according to claim 7, wherein both the first and second common intermediate frequency bands and are in the range 3.4 to 4.2 GHz.

24. The reconfigurable system according to claim 7, wherein the first common intermediate frequency band is in the range 7.9 to 8.4 GHz and the second common intermediate frequency band is in the range 7.25 to 7.75 GHz.

25. The reconfigurable system according to claim 7, wherein the first common intermediate frequency band is in the range 0.304 to 0.318 GHz and the second common intermediate frequency band is in the range 0.2431 to 0.2569 GHz.

26. The reconfigurable system according to claim 7, wherein both the first and second common intermediate frequency bands and are in the range 7.25 to 7.75 GHz.

27. The reconfigurable system according to claim 7, wherein the first common intermediate frequency band is in the range 14 to 14.5 GHz and the second common intermediate frequency band is in the range 11.7 to 12.2 GHz.

28. The reconfigurable system according to claim 7, wherein both the first and second common intermediate frequency bands are in the range 11.7 to 12.2 GHz.

29. The reconfigurable system according to claim 7, wherein both the first and second common intermediate frequency bands and are in the range 0.2431 to 0.2569 GHz.

30. A satellite payload comprising a reconfigurable system according to claim 8.

31. An agile filter means for analogue processing of radio frequency signals in a satellite communications system, comprising:
   variable frequency converters and two fixed filters, adapted to select a first frequency channel signal from an input signal of a first intermediate frequency band, to amplify and provide automatic gain control of the selected first frequency channel signal and to translate the selected first frequency channel signal to a second frequency channel signal within a pre-selected second intermediate frequency band,
   wherein the agile filter means is controllable to allow in-orbit reconfiguration of the system.

32. A system for processing radio frequency signals received in a plurality of uplink bands and for processing radio frequency signals for transmission in a plurality of downlink bands in a satellite communications system, comprising:
   a downconverter arrangement for downconverting received radio frequency signals in the plurality of uplink bands to a first common intermediate frequency band (IF1);
   means for dividing and routing the downconverted signals;
   agile filter means adapted to select signals of one or more first frequency channels of the routed signals and to translate the signals of the selected one or more first frequency channels to signals of one or more second frequency channels within a second common intermediate frequency band (IF2); and
   an up-converter arrangement for up-converting the frequency translated signal to one or more appropriate downlink bands,
   wherein the agile filter means is controllable to allow in-orbit reconfiguration of the system, and
   wherein the first common intermediate frequency band is selected from a frequency range corresponding to one of the plurality of uplink bands and the second common intermediate frequency band is selected from a frequency range corresponding to one of the plurality of downlink bands, or
   wherein the first common intermediate frequency band and the second common intermediate frequency band are selected from a frequency range corresponding to one of the plurality of uplink bands or one of the plurality of downlink bands, or
   wherein a first intermediate frequency is selected from a first frequency range corresponding one of the plurality of uplink bands or a second intermediate frequency is selected from a second frequency range corresponding to one of the plurality of downlink bands.

33. The reconfigurable system according to claim 1, wherein the first common intermediate frequency band is selected from a frequency range corresponding to one of the plurality of uplink bands and the second common intermediate frequency band is selected from a frequency range corresponding to one of the plurality of downlink bands.

34. The reconfigurable system according to claim 1, wherein the first common intermediate frequency band and the second common intermediate frequency band are selected from a frequency range corresponding to one of the plurality of uplink bands or one of the plurality of downlink bands.

35. A system for processing radio frequency signals received in a plurality of uplink bands and for processing radio frequency signals for transmission in a plurality of downlink bands in a satellite communications system, comprising:
   a plurality of downconverters for downconverting received radio frequency signals in the plurality of uplink bands to a first common intermediate frequency band;
   a plurality of dividers for dividing the downconverted signals;
   a routing and switching arrangement configured to route the divided signals;
   an agile filter arrangement including a plurality of variable filters, each variable filter being configured to select a first frequency channel of a routed signal and to translate the signal of the selected first frequency channel to a signal of a second frequency channel within a second common intermediate frequency band; and
   a plurality of upconverters, each upconverter being configured to up-convert frequency translated signals in the second common intermediate frequency band to an appropriate downlink band of the plurality of downlink bands, wherein the agile filter arrangement is controllable to allow in-orbit reconfiguration of the system, and wherein the first common intermediate frequency band is selected from a frequency range corresponding to one of the plurality of uplink bands and the second common intermediate frequency band is selected from a frequency range corresponding to one of the plurality of downlink bands, or wherein the first common intermediate frequency band and the second common intermediate frequency bands are selected from a frequency range corresponding to one of the plurality of uplink bands or one of the plurality of downlink bands.

36. A system for processing radio frequency signals received in a plurality of uplink bands and for processing radio frequency signals for transmission in a plurality of downlink bands in a satellite communications system, comprising:

a plurality of downconverters for downconverting received radio frequency signals in the plurality of uplink bands to a first common intermediate frequency band;

a plurality of dividers for dividing the downconverted signals;

a routing and switching arrangement configured to route the divided signals;

an agile filter arrangement comprising a plurality of variable filters, each variable filter being configured to select a first frequency channel of a routed signal and to translate the signal of the selected first frequency channel to a signal of a second frequency channel within a second common intermediate frequency band; and a plurality of upconverters, each upconverter being configured to upconvert frequency translated signals in the second common intermediate frequency band to an appropriate downlink band of the plurality of downlink bands, wherein the agile filter arrangement is controllable to allow in-orbit reconfiguration of the system and the agile filter arrangement is controllable to select appropriate first and second frequency channels in dependence on system requirements at a particular time.

\* \* \* \* \*